Oct. 31, 1967 T. STOTT ETAL 3,349,823
CORN GRINDER FIELD OPERATION
Filed July 15, 1964 4 Sheets-Sheet 4

INVENTORS.
TED STOTT
H. HARVEY SCHULZE
LYMAN J. GUNYOU
BY
ATTORNEYS.

United States Patent Office 3,349,823
Patented Oct. 31, 1967

3,349,823
CORN GRINDER FOR FIELD OPERATION
Ted Stott, Celina, Herman Harvey Schulze, Coldwater, and Lyman J. Gunyou, Celina, Ohio, assignors to Avco Corporation, Coldwater, Ohio, a corporation of Delaware
Filed July 15, 1964, Ser. No. 382,739
6 Claims. (Cl. 146—79)

This invention relates to a grinder suitable for processing ear corn and other feed grains.

The unit disclosed as an illustrative structure is particularly adapted for field operation to receive snapped ears of corn from a gathering unit normally part of the corn harvester, grind the material, and deliver it to a wagon towed behind the harvester grinder unit.

The machine comprises suitable auger conveying mechanism to receive snapped ears from the gathering unit and positively transfer such ears into a revolving cylinder type of knife chopper assembly. The knife assembly is mounted for rotation in a cage of generally cylindrical form with an opening at one side thereof to receive the ears for processing. The knives, acting against a shear bar, cut the ears and husks into pieces. A perforated sheet is placed directly below the revolving cylinder to keep the material within the cylinder until it is reduced to such size as to pass through the perforations. The knives rotate quite close to the perforated arcuate shaped sheet, but the top portion of the generally cylindrical cage departs from the periphery of the knife assembly so that material forced into the cylinder from the auger through the opening is thrown upward into the space, or pocket, between the cylinder and the wall near the top of the cage, and the continuous rotation of the knife assembly acting on the material retained in the cylinder, and on the material which is thrown or directed back into the knife assembly from the pocket, gradually breaks up the material until it is reduced to such size as to pass through the perforations in the lower arcuate portion. The perforations are preferably larger than shelled corn kernels. The material, then falling from the perforated portion downwardly by gravity, falls on two grooved, serrated, crushing rolls positioned quite close together and counter-rotating. The rolls are set closely together to crush or crimp the material, particularly the kernels of corn. The kernels are not reduced to dust but are merely crushed to the extent of breaking the outer kernel sheath. Material thus processed is then delivered to a towed wagon by means of an auger conveyor operating from underneath the rolls and to an inclined auger conveyor with an outlet above the wagon. The disclosed structure of the invention is adapted for use as a field-going unit employing a combination of elements which will cut or chop whole ears of corn with husks and sometimes parts of the stalk, size the material, crush or crack the kernels, and deliver the homogeneous mixture to a wagon. In addition to being a field-going unit, this machine can be readily adapted for use in stationary operation where the whole ears are hauled to the grinder and processed.

Other features and objects of the invention will appear more fully from the following more detailed description and by reference to the accompanying drawings, forming a part hereof and wherein.

Figure 1:
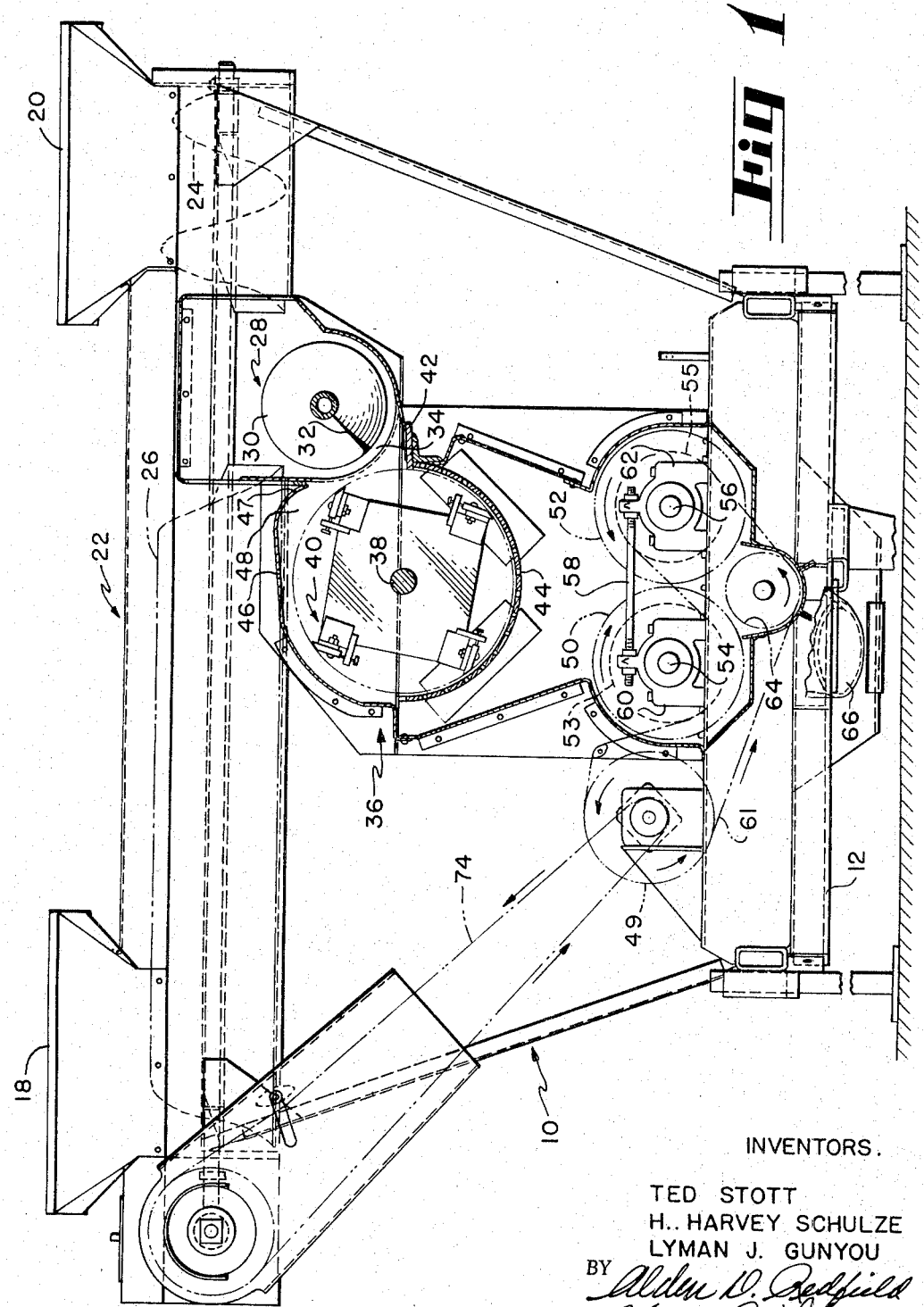
FIGURE 1 is a view partly in section through the conveyor, showing the cage with its knife assembly with the lower counter-rotating crushing rolls and conveyor beneath the rolls.
Figure 2:
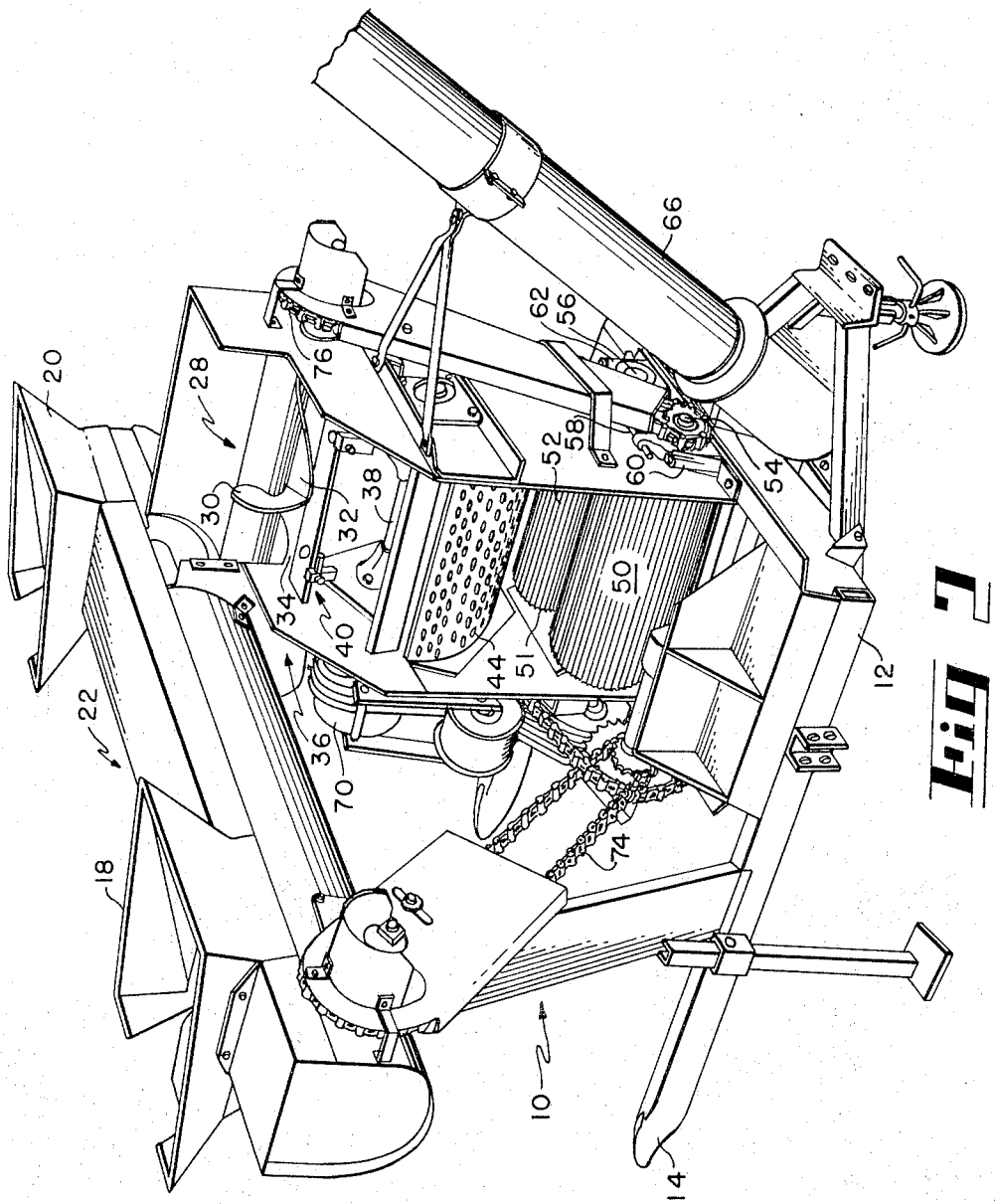
FIGURE 2 is a perspective view with the cover over the inlet portion of the conveyor and the knife assembly removed, showing the cage and the counter-rotating rolls.
Figure 3:
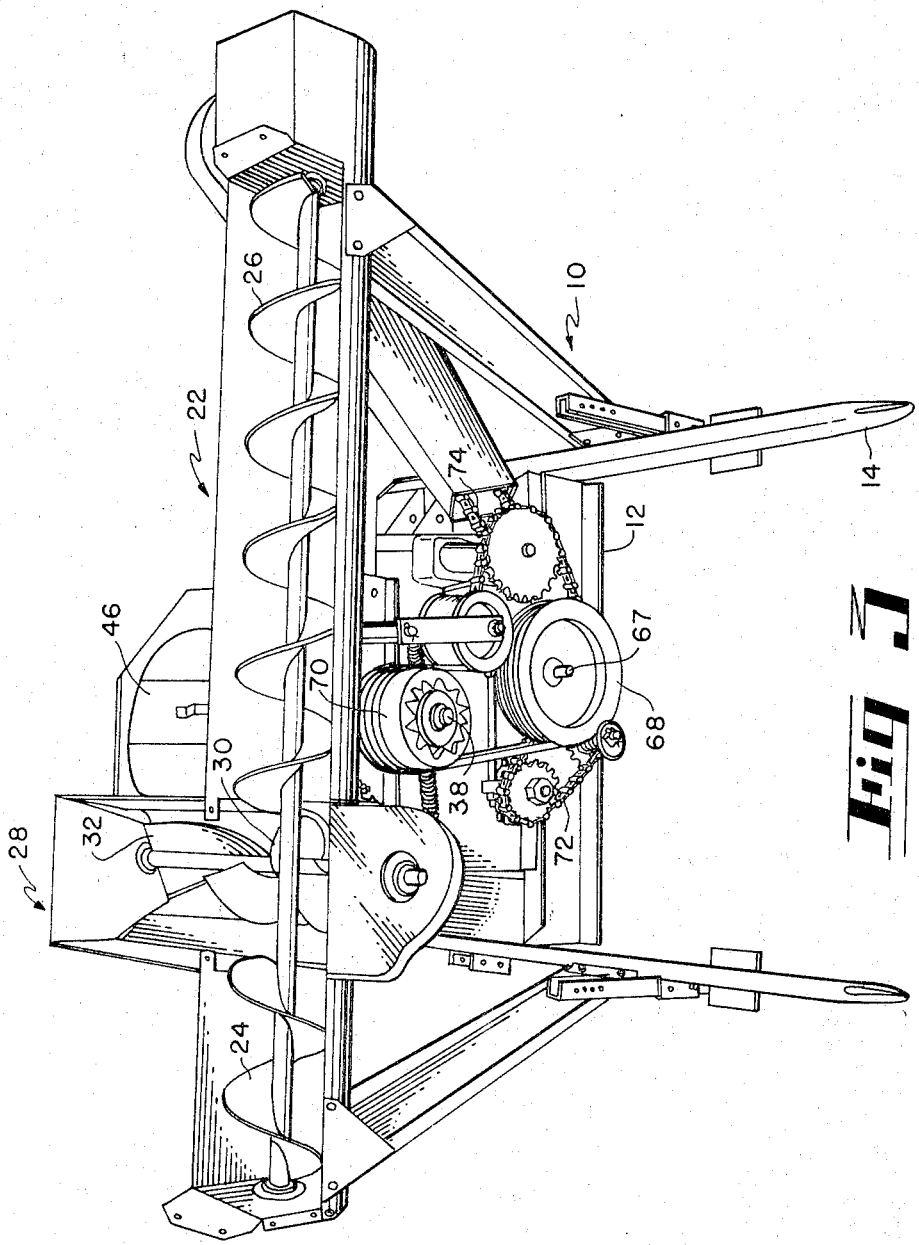
FIGURE 3 is a perspective view but from the opposite side of the unit from that shown in FIGURE 2 and shows particularly the auger conveyor assembly and the several drive shafts for the unit.

Referring to the drawings and particularly to FIGURE 1, the field grinder unit 10 is carried on a frame 12, which is also shown in FIGURES 2 and 3, and is adapted to be supported on the rear of a corn harvester assembly, such as is shown in U.S. Patent 3,108,417, where bayonet-type projections 14 are provided to attach the frame 12 to the subframe and forward ear-snapping portion of the harvester which removes ears from stalks by the forward snapping unit and delivers such ears of corn to the hoppers 18, 20 at opposite ends of a cross conveyor 22 on other suitable feeding mechanism. The cross conveyor 22 is provided with suitable auger flights 24, 26, as shown in FIGURE 3, which move the snapped corn ears toward a feeding auger conveyor assembly 28. This assembly, as shown in FIGURES 2 and 3, has a transfering auger 30 and a terminal transfer member 32. By this mechanism the ears of corn, fed by the augers 24, 26 into the auger conveyor assembly 28, are moved longitudinally by the conveyor 28 toward the terminal transverse feed members 32 by the auger flight 30. The material arriving at the transverse member 32 is positively pushed at right angles to the rotation of the auger 28 into an opening 34 in a cage assembly 36. This cage assembly has mounted therein a shaft 38 which carries a cylindrical knife assembly 40 for rotation. The opening 34 has a shear bar 42 at its lower edge and the cage assembly 36 is provided with a lower perforated arcuate portion 44 closely adjacent to the arc of rotation of the knife assembly 40. The upper portion of the cage 36 departs away from the periphery of the knife assembly 40 and the arc of the radius of the perforated portion 44, forming a pocket 48. This departing upper pocket portion of the cage 36 is formed by a sheet metal cover 46. The pocket portion wall in cover 46 progressively increases in radial dimension from and in the direction of rotation of the knife assembly in the wall region adjacent the pocket 48.

Figure 4:
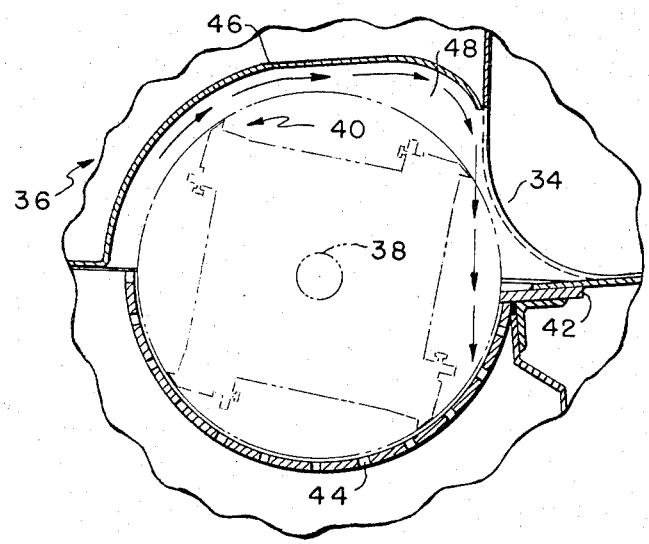
FIGURE 4 is a diagram showing the cross section of the knife assembly and adjacent cage with indication of the path of flow of material into the top portion thereof and directed downwardly into the knives.

It is important to note that the sheet metal cover 46, forming the pocket 48, terminates in a curved portion 47 which will direct material downwardly (see FIGURE 4) when it is thrown into the pocket and this curved portion terminates inward of a vertical plane through the inside edge 43 of shear bar 42 and is thus so located as to throw material downward in a region spaced inwardly relative to the periphery of the knife assembly 40 from the inner edge of the shear bar 42. Thus material thrown upward into the pocket 48 is directed downwardly into the knife assembly and most of it moves into this assembly inward of the shear bar.

Below the knife assembly and arcuate perforated sheet 44 of cage 36, there are provided two counter-rotating rolls 50, 52. These rolls are supported on shafts 54, 56 and the surface of these serrated rolls comes in relatively close contact, such contact being adjustable by the threaded adjustment rod 58 which connects the two bearing blocks 60, 62 for the shafts 54, 56.

Figure 5:
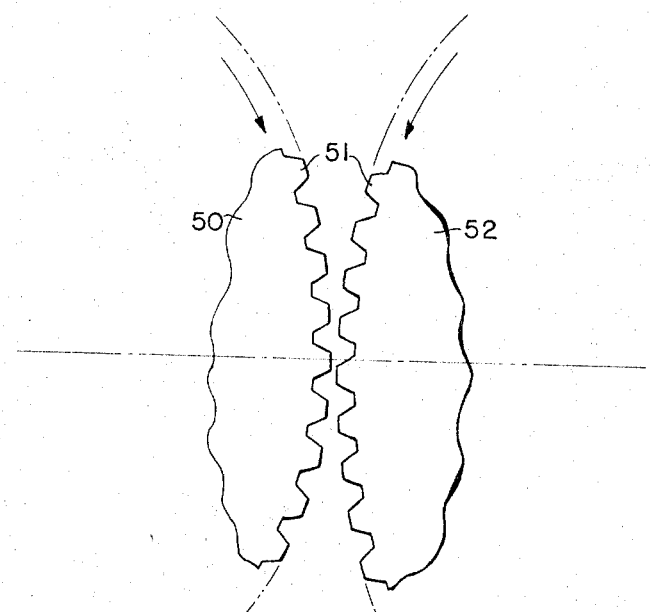
FIGURE 5 is a fragmentary cross section through the counter-rotating rolls showing the serrations and the relationship of the two rolls for crushing.

As shown in FIGURE 5 (full size) counter-rotating rolls 50, 52 are both provided with longitudinally extended serrations in the surface thereof. These serrations are also shown in FIGURE 2. The serrated surfaces are important in providing aggressiveness in feeding material into the rolls, but the depth and width of serrations less than normal thickness of a corn kernel is also of importance. FIGURE 5 shows the relationship of the serrations on the counter-rotating rolls and it is noted that the width spacing between the serrations, as well as the depth of spaces, is less than the width or thickness of a normal size corn kernel. Thus any material including shelled kernels of corn passing through such counter-rotating rolls will be sized or cracked, although not necessarily reduced to a very small size. The drive provided for the counter-rotating rolls 50, 52 (see FIGURE 1) comes from a main drive shaft 67 which is axially aligned and connected with shaft 54 carrying sprocket wheel 53 which rotates roller 50 in the direction shown by the arrow in FIGURE 1. Sprocket 53, shown dotted, is on the opposite side of the unit from the front, shown in FIGURE 1. Likewise, on the opposite side of the unit there is a sprocket 55 which is connected to rotate shaft 56 and the roller 52. A chain 61, also on the opposite side of the unit in FIGURE 1, shown in dot and dash lines, is connected as shown to drive the counter-rotating rollers 50, 52 in counter-rotation through contact with sprockets 53 and 55, as well as sprockets 49 and 61. It is noted that sprocket 53 is slightly larger than sprocket 55 so that one of the rollers rotates faster than the other and therefore there is a relative rotative speed in the periphery of the rollers 50, 52 which provides a differential in the rate of rotation, assuring that they will never be continuously running together at the same speed and therefore will assure that there is a relative shearing action on any material carried between the rolls and also assuring that the rollers will not run together in such a way that the peaks of the serrations or the spaces between the serrations are always matched, but rather that they always have a relative rotation to each other. This construction is important in avoiding build-up of material and also to assure that satisfactory grinding action will be accomplished.

Below the counter-rotating rolls 50, 52 is provided an auger conveyor 64 which is so located as to feed material into another portion 66 of an auger conveyor, which is shown in FIGURE 2, and extends upwardly and may be provided with an outlet into a wagon towed behind the harvester. As shown in FIGURE 3, the power trains driving the units are driven from a main shaft 67 which carries a belt pulley 68 which drives the pulley 70 carried on the shaft 38 of the knife assembly. The drives for the various conveyor units are made by chain drives 72 in suitable detail not important to an understanding of this disclosure, but which are evident as connecting through chain 74 extending upwardly to drive the conveyor augers 24, 26 of cross conveyor 22, as well as the conveyor auger 28 by chain 76 on the opposite side of the unit, shown best in FIGURE 2.

In operation, as has been generally described previously, the ears of corn are delivered by means of the auger 24, 26 into the conveyor 28 which extends horizontally and parallel with the axis of rotation of the shaft 38 of the knife assembly 40, but at one side thereof. The ears, carried by the auger flights 30 to the terminal transfer members 32, are pushed very positively through the opening 34 for cutting action by the knife assembly 40 against the shear bar 42. This creates a chopping action and effects initial chopping of the material as it is forced through the opening 34. It is important to note that the material is continuously forced into the cage 36 through the opening 34 and, although it is chopped initially as it enters on the shear bar 42, the fact that there is continuous feed of material, namely, ears of corn or other material to be ground into the cage, there is a definite tendency of the cage to be kept full of material and the material is therefore retained in the cage, and when the material has been sufficiently chopped it will go through the perforations in the arcuate portion 44. However, during this process it is important to note that the material is free to be thrown upwardly into the pocket space 48 at the top of the unit and is directed into the rotating knife assembly 40 and, either by further contact with the shear bar or contact of the knives generally rotating in a full cage, the material is gradually ground and torn apart; and because of the fact that it cannot get out of the cage other than by the perforations in the arcuate portion 44, the material is chopped and acted upon by the knife assembly until it is reduced to a size which will go through the perforations. When this occurs the material drops downwardly onto the counter-rotating rolls 50, 52 and, because of the close proximity of these rolls and the serrations, the material is sized. Substantially all kernels of corn are cracked because of size of serrations being less than the width of kernels, as previously stated. The kernels are therefore cracked and the other ground material sized to a definite homogeneous size again by the rolls 50, 52 and finally drops beneath the rolls onto the auger conveyor 64 where it is conveyed to the inclined auger conveyor 66 and thence out to be received in a wagon or other receptacle.

It is noted that it is preferable that the perforations in the lower arcuate portion 44 are large enough to allow whole kernels of corn which may be shelled from the ears during chopping to pass through such perforations and that therefore a major portion of such kernels may reach the counter-rotating crushing rolls 50, 52 in whole kernel condition and that therefore the spacing between the counter-rotating periphery of the rolls 50, 52 at their closest point of contact is manually adjustable by means of the adjustment, such as screw thread arrangement 58 shown in FIGURE 1, to assure that said kernels will be cracked by the rolls and serrations 52 a desired controlled amount by the action of said counter-rotating rolls. Adjustment is therefore possible to assure cracking of all kernels, but not to reduce to dust by action of serrations 51 less than kernel size. The other material will of course be finally sized to this manually adjustable distance between the counter-rotating rolls and delivered to the conveyor 66 below the rolls for delivery to the desired receptacle or wagon.

Although the invention has been described by reference to a specific structure found practical in actual operation, it is intended that various modifications may be made within the scope of the following claims.

We claim:

1. In a grinder for whole ear corn and other feed materials:

a rotatable knife assembly;

a generally cylindrical cage surrounding said knife assembly;

an opening in said cage to receive said material;

a shear bar adjacent said opening positioned in shearing relationship with said rotatable knife assembly to chop material entering said opening;

a lower substantially arcuate screen portion of said cage having perforated openings therein;

an upper portion of said cage having an upper pocket portion wall positioned at greater radial distance from the axis of rotation of said knife assembly than said lower screen portion;

an end portion of said pocket wall curved toward said knife assembly and terminating in a region offset toward said knife assembly from a vertical plane through the edge of said shear bar, whereby said pocket wall and said curved end portion thereof directs flow of material into said knife assembly for further chopping;

transfer means forcing said materials into said opening in said cage to fill said cage with materials, whereby said materials are chopped by said knife assembly against said shear bar on entry into said opening and retained in said cage for further chopping by said knives adjacent said pocket wall and subsequently forced through said perforated lower wall by said knives to fall by gravity downwardly from said cage;

adjacent rotating crushing rolls mounted for counter-rotating action and positioned below said cage to receive chopped material falling by gravity from said lower perforated wall portion of said cage, thereby to crush such materials and deliver said materials below said rotating crushing rolls.

2. In a grinder for whole ear corn and other feed materials:

a rotatable knife assembly;

a generally cylindrical cage surrounding said knife assembly;

an opening in said cage to receive said material;

a shear bar adjacent said opening positioned in shearing relationship with said rotatable knife assembly to chop material entering said opening;

a lower substantially arcuate screen portion of said cage having perforated openings therein;

an upper portion of said cage having an upper pocket portion wall positioned at greater radial distance from the axis of rotation of said knife assembly than said lower screen portion;

said pocket wall curved toward said knife assembly and terminating in a region offset toward said knife assembly from a vertical plane through the edge of said shear bar, whereby said pocket wall and said curved end portion thereof directs flow of material into said knife assembly for further chopping.

3. In a grinder as defined in claim 2 in which the said upper pocket portion wall progressively increases in radial dimension from and in the direction of rotation of the knife assembly in the wall region adjacent the pocket formed in said wall.

4. In a grinder as defined in claim 2 in which an auger conveyor having an axis of rotation spaced laterally from and parallel to the axis of rotation of said knife assembly and positioned for termination adjacent said opening in said cylindrical cage positioned to force feed material into said cage to fill said cage, whereby said ear corn and other materials are chopped by said knife assembly against said shear bar on entry into said openings from said conveyor and retained in said cage for further chopping by said knives adjacent said pocket wall and subsequently through said perforated lower wall by said knife assembly to fall by gravity downwardly from said cage.

5. In a grinder as defined in claim 2 in which the perforated openings in said lower arcuate screen portion of said cage are sufficiently large to allow shelled kernels of corn to fall through said openings;

a pair of counter-rotating serrated rollers below said cage and positioned in manually adjustable spaced relationship with counter-rotating peripheries closely adjacent but with clearance therebetween less than the normal minimum thickness of ear corn kernels, thereby cracking said kernels and crushing other materials to a size limitation defined by the clearance between said rollers when said materials and ear corn kernels fall through the perforated openings of said arcuate screen portion onto said counter-rotating rollers.

6. In a grinder as defined in claim 5 in which drive means for said counter-rotating rolls causing one roll to rotate at slower speed than its adjacent roll, thereby to assure that said serrations and spaces therebetween on adjacent counter-rotating peripheries of said rolls have relative shearing action on material passing therebetween.

References Cited

UNITED STATES PATENTS

| | | | |
|---|---|---|---|
| 1,467,131 | 9/1923 | Wikel et al. | 146—79 X |
| 2,005,940 | 6/1935 | Holland-Letz | 146—79 |
| 2,359,911 | 10/1944 | Grindle | 241—186 X |
| 2,873,921 | 2/1959 | Christiansen | 241—157 X |
| 2,927,740 | 3/1960 | Berk | 241—186 |
| 3,066,876 | 12/1962 | Verdier | 241—159 |
| 3,194,288 | 7/1965 | Dodgen et al. | 146—79 |
| 3,217,765 | 11/1965 | Anderson | 146—79 X |

ANDREW R. JUHASZ, *Primary Examiner.*

WILLIAM W. DYER, Jr., JAMES M. MEISTER,
*Examiners.*